United States Patent
He et al.

(10) Patent No.: US 11,402,194 B2
(45) Date of Patent: Aug. 2, 2022

(54) SAFETY PIPE LOOP AND METHOD FOR STRAIN MONITORING OF MOUNTAINOUS PIPELINES

(71) Applicant: SOUTHWEST PETROLEUM UNIVERSITY, Sichuan (CN)

(72) Inventors: Tengjiao He, Chengdu (CN); Kexi Liao, Chengdu (CN); Guoxi He, Chengdu (CN); Shuai Zhao, Chengdu (CN); Shuting Yang, Chengdu (CN); Hongdong Zhu, Chengdu (CN); Jian Tang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 17/229,940

(22) Filed: Apr. 14, 2021

(65) Prior Publication Data
US 2022/0170730 A1    Jun. 2, 2022

(30) Foreign Application Priority Data
Dec. 1, 2020  (CN) .......................... 202011386730.1

(51) Int. Cl.
*G01B 7/24*    (2006.01)
*F17D 5/00*    (2006.01)
(Continued)

(52) U.S. Cl.
CPC .................. *G01B 7/24* (2013.01); *F17D 5/00* (2013.01); *G01L 1/127* (2013.01); *G01N 27/725* (2013.01); *G01N 27/9086* (2013.01)

(58) Field of Classification Search
CPC ...... G01N 27/72; G01N 27/725; G01N 27/82; G01N 27/83; G01N 27/85; G01N 27/87;
(Continued)

(56) References Cited

U.S. PATENT DOCUMENTS 3,484,682 A * 12/1969 Wood ................... G01N 27/904
                                                          346/33 F
8,949,042 B1 *  2/2015 Goroshevskiy ........ G01N 27/82
                                                          702/38
(Continued)

FOREIGN PATENT DOCUMENTS

CN        102735746 A    10/2012
CN        103063737 A     4/2013
(Continued)

OTHER PUBLICATIONS

First Office Action in Chinese Application No. 202011386730.1 dated Oct. 25, 2021, 18 pages.
(Continued)

*Primary Examiner* — Herbert K Roberts
(74) *Attorney, Agent, or Firm* — Metis IP LLC

(57) ABSTRACT

The present disclosure discloses a safety pipe loop and method for strain monitoring of mountainous pipelines. The safety pipe loop may include a plurality of magnetic test detectors and a protective shell for protecting the plurality of magnetic test detectors. The number of the plurality of magnetic test detectors may be set to 4n, n is an integer number greater than or equal to 1. An angle between any two adjacent detectors of the plurality of magnetic test detectors may be 180°/2n. At least two of the plurality of magnetic test detectors may be connected in parallel through a data transmission line and output data through a data transmission interface. An outer layer of the protective shell may include non-magnetic hard alloy, and an inner layer of the protective shell may include non-metallic materials.

6 Claims, 6 Drawing Sheets

(51) Int. Cl.
*G01N 27/72* (2006.01)
*G01L 1/12* (2006.01)
*G01N 27/90* (2021.01)

(58) Field of Classification Search
CPC .. G01N 27/90; G01N 27/9006; G01N 27/904; G01N 27/9073; G01N 27/9086; G01L 1/12; G01L 5/169; G01B 7/24
See application file for complete search history.

(56) References Cited

U.S. PATENT DOCUMENTS

| | | | |
|---|---|---|---|
| 2004/0183528 A1* | 9/2004 | Crouch | G01N 27/725 324/228 |
| 2005/0179430 A1* | 8/2005 | Park | G01N 27/82 324/240 |
| 2015/0309127 A1* | 10/2015 | Ausserlechner | G01R 33/091 324/252 |
| 2021/0372094 A1* | 12/2021 | Al-Muslim | G01M 3/2815 |

FOREIGN PATENT DOCUMENTS

| | | | | |
|---|---|---|---|---|
| CN | 103075641 A | | 5/2013 | |
| CN | 105738837 A | * | 7/2016 | ............. G01R 33/02 |
| CN | 105738837 A | | 7/2016 | |
| CN | 106321994 A | * | 1/2017 | |
| CN | 110793852 A | * | 2/2020 | |
| CN | 110806191 A | | 2/2020 | |
| CN | 110806191 A | * | 2/2020 | ............. G01B 21/32 |
| CN | 111141436 A | | 5/2020 | |
| CN | 111964817 A | * | 11/2020 | ............. G01L 1/255 |
| CN | 111964817 A | | 11/2020 | |
| CN | 111999176 A | | 11/2020 | |
| CN | 111999176 A | * | 11/2020 | |
| DE | 102010020445 A1 | | 11/2011 | |
| KR | 102067531 B1 | * | 1/2020 | |
| WO | 2010151453 A2 | | 12/2010 | |

OTHER PUBLICATIONS

The Second Office Action in Chinese Application No. 202011386730.1 dated Dec. 20, 2021, 20 pages.

The Notification to Grant Patent Right for Invention in Chinese Application No. 202011386730.1 dated Mar. 2, 2022, 3 pages.

He, Defu el al., Evaluation on Performance of Germany-Made Feritscope MP-30E Magnetic Determinator for Ferrite Content in Weld Metal of Duplex Stainless Steel Weld Pipe, Steel Pipe, 38(4): 59-65, 2009.

* cited by examiner

SAFETY PIPE LOOP AND METHOD FOR STRAIN MONITORING OF MOUNTAINOUS PIPELINES

CROSS-REFERENCE TO RELATED APPLICATIONS

This application claims priority to Chinese Patent Application No. 202011386730.1 filed on Dec. 1, 2020, the contents of which are incorporated herein by reference in its entirety.

TECHNICAL FIELD

The present disclosure relates to the technical field of safety monitoring of oil and gas pipeline structure, and in particular to a safety pipe loop and method for strain monitoring of mountainous pipelines.

BACKGROUND

The geographical environment along mountainous pipelines is complex and the height difference is large. Under the action of multiple loads and unstable geological conditions, the pipelines are susceptible to concentrated loads, and there are risks such as deformation and fracture. Therefore, it is necessary to provide a device and method for safety monitoring of pipelines to obtain long-term real-time status data of the target pipe section, so as to ensure the safe operation of mountainous pipelines.

SUMMARY

An aspect of the present disclosure provides a safety pipe loop for strain monitoring of mountainous pipelines. The safety pipe loop may include a plurality of magnetic test detectors and a protective shell for protecting the plurality of magnetic test detectors. A count of the plurality of magnetic test detectors may be set to 4n, n is an integer number greater than or equal to 1. An angle between any two adjacent detectors of the plurality of magnetic test detectors may be 180°/2n. At least two of the plurality of magnetic test detectors may be connected in parallel through a data transmission line and output data through a data transmission interface. An outer layer of the protective shell may include non-magnetic hard alloy, and an inner layer of the protective shell may include non-metallic materials.

In some embodiments, the protective shell includes an upper half-ring and a lower half-ring that are operably connected and symmetrical with each other.

In some embodiments, a first end of the upper half-ring and a first end of the lower half-ring may be hinged. A second end of the upper half-ring and a second end of the lower half-ring may be respectively provided with a lug. The lugs of the upper half-ring and the lower half-ring may be detachably connected.

In some embodiments, a first end and a second end of the upper half-ring, and a first end and a second end of the lower half-ring may be respectively provided with a lug. The lugs at the first end of the upper half-ring and the first end of the lower half-ring may be detachably connected. The lugs at the second end of the upper half-ring and the second end of the lower half-ring may be detachably connected.

In some embodiments, a rubber gasket may be provided between the upper half-ring and the lower half-ring.

In some embodiments, one of the plurality of magnetic test detectors may include at least one sensor and a housing for protecting the at least one sensor.

In some embodiments, a count of the at least one sensor may be one or two.

In some embodiments, the housing may include a non-metallic material.

In some embodiments, the at least one sensor may include a single-axis fluxgate sensor.

Another aspect of the present disclosure provides a method for strain monitoring of mountainous pipelines. The method may include installing a safety pipe loop provided in the present disclosure for strain monitoring of mountainous pipelines on a monitored pipeline. The method may also include installing a supporting device of the safety pipe loop. The supporting device may include a data collector. The method may also include, for each of the plurality of magnetic test detectors of the safety pipe loop, converting, based on a correction factor of the magnetic test detector, a change value into a local longitudinal strain value of a monitoring location on the monitored pipeline corresponding to the magnetic test detector. The change value may be obtained based on normal magnetic induction intensity values of a surface of the monitored pipeline. The normal magnetic induction intensity values may be collected by the data collector from the safety pipe loop. The method may also include determining an overall axial strain value of a section of the monitored pipeline based on the local longitudinal strain values of the plurality of magnetic test detectors. The method may also include determining an axial strain warning threshold of the monitored pipeline. The method may also include comparing the axial strain warning threshold with the overall axial strain value. The method may also include determining a monitoring strategy based on a signal characteristic of the plurality of magnetic test detectors and the comparison result.

In some embodiments, the correction factor of one of the plurality of magnetic test detectors may be determined by a process including the following operations. The process may include making a flat test piece using a same material as the monitored pipeline. The process may also include clamping the flat test piece on a clamp of a tensile testing machine. The process may also include fixing the magnetic test detector directly above a measurement line of the flat test piece. A magnetic field test direction of the magnetic test detector may be consistent with a loading direction of the flat test piece. The process may also include turning on the tensile testing machine to perform a cyclic loading process to stretch the flat test piece. The process may also include obtaining values of a normal magnetic induction intensity of a surface of the flat test piece within a range of elastic deformation of the flat test piece during the cyclic loading process. The process may also include determining a change curve of change values of the normal magnetic induction intensity by processing the values of the normal magnetic induction intensity of the surface of the flat test piece. The process may also include obtaining an actual strain curve of the flat test piece during the cyclic loading process from an upper computer corresponding to the tensile testing machine. The process may also include determining a value of the correction factor by comparing the change curve with the actual strain curve.

In some embodiments, the change value may be converted into the local longitudinal strain value based on:

$$E\varepsilon_L = f_y \cdot \Delta B_y,$$

wherein E is an elastic modulus of a material of the monitored pipeline, a unit of which is MPa; $\varepsilon_L$ is the local longitudinal strain value, a unit of which is µε; $f_y$ is the correction factor, which is dimensionless; and $\Delta B_y$ is the change value, a unit of which is nT.

In some embodiments, the overall axial strain value may be determined based on:

$$\varepsilon_a = \frac{1}{4n} \sum_{i=1}^{4n} \varepsilon_{Li} - \gamma * \varepsilon_{hp}, \text{ and}$$

$$\varepsilon_{hp} = \frac{PD}{2\delta E},$$

wherein $\varepsilon_a$ is the overall axial strain value, a unit of which is µε; a count of the plurality of magnetic test detectors in the safety pipe loop is 4n; $\varepsilon_{Li}$ is the local longitudinal strain value of the ith magnetic test detector of the plurality of magnetic test detectors, a unit of which is µε; γ is a Poisson coefficient of the monitored pipeline, which is dimensionless; $\varepsilon_{hp}$ is a hoop strain of the monitored pipeline, a unit of which is µε; P is an operating pressure of the monitored pipeline, a unit of which is MPa; D is a diameter of the monitored pipeline, a unit of which is mm; and δ is a wall thickness of the monitored pipeline, a unit of which is mm.

In some embodiments, the axial strain warning threshold may be determined based on:

$$\varepsilon_T = \frac{\sigma_s}{2.2E\eta},$$

wherein $\varepsilon_T$ is the axial strain warning threshold, a unit of which is µε; $\sigma_s$ is a yield strength of a material of the monitored pipeline, a unit of which is MPa; and η is a safety factor, which is dimensionless.

In some embodiments, the monitoring strategy may include at least one of: a strategy that in response to determining that the overall axial strain value is less than the axial strain warning threshold and a signal characteristic of the plurality of magnetic test detectors is a separated state, a circumferential weld of the monitored pipeline is monitored, and a pipeline body of the monitored pipeline is used normally; a strategy that in response to determining that the overall axial strain value is less than the axial strain warning threshold and the signal characteristic of the plurality of magnetic test detectors is a similar trend state, the circumferential weld of the monitored pipeline and the pipeline body of the monitored pipeline are used normally; a strategy that in response to determining that the overall axial strain value is greater than or equal to the axial strain warning threshold and the signal characteristic of the plurality of magnetic test detector is a separated state, the circumferential weld of the monitored pipeline is repaired immediately, and the pipeline body is monitored; or a strategy that in response to determining that the overall axial strain value is greater than or equal to the axial strain warning threshold and the signal characteristic of the plurality of magnetic test detector is a similar trend state, the circumferential weld of the monitored pipeline and the pipeline body of the monitored pipeline are monitored.

In some embodiments, the method may also include determining the correction factor of each of the plurality of magnetic test detectors. The method may also include assembling the plurality of magnetic test detectors each of which is provided with the corresponding correction factor, so as to obtain the safety pipe loop provided in the present disclosure.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular exemplary embodiments only and is not intended to be limiting. As used herein, the singular forms "a," "an," and "the" may be intended to include the plural forms as well, unless the context clearly indicates otherwise. It will be further understood that the terms "comprise,"

"comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure. It is understood that the drawings are not to scale.

Figure 1:
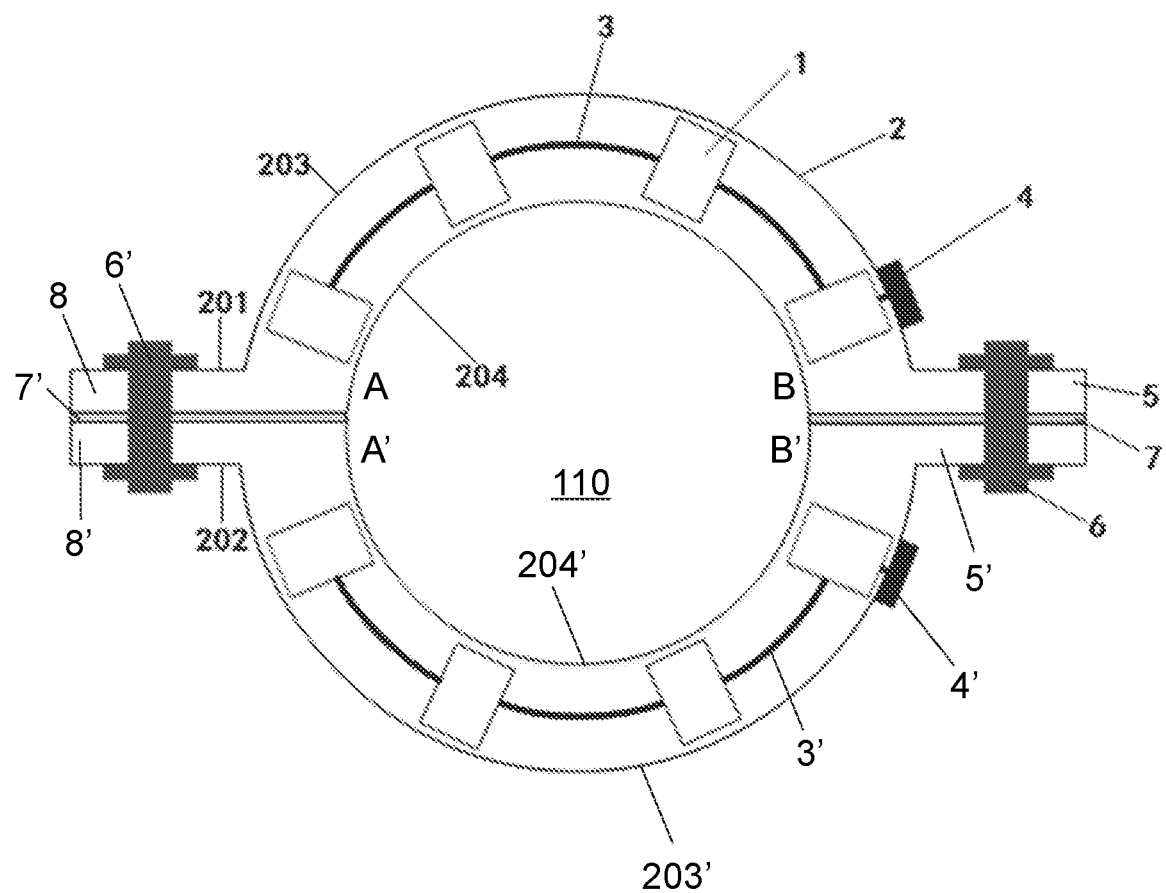
FIG. 1 is a schematic structural diagram illustrating an exemplary safety pipe loop for strain monitoring of mountainous pipelines according to some embodiments of the present disclosure.

FIG. 1 is a schematic structural diagram illustrating an exemplary safety pipe loop for strain monitoring of mountainous pipelines according to some embodiments of the present disclosure. The safety pipe loop provided in the present disclosure may be applied to monitor an axial strain of a pipeline.

As shown in FIG. 1, in some embodiments, a safety pipe loop 100 for strain monitoring of mountainous pipelines may include at least one magnetic test detector (e.g., the magnetic test detector 1) and a protective shell 2 for protecting the at least one magnetic test detector. The at least one magnetic test detector may be configured to test a normal magnetic induction intensity of a surface of a monitored pipeline. In some embodiments, the protective shell 2 may form an accommodation space 110. For example, the protective shell 2 may include a tubular structure. The monitored pipeline may pass through the circular accommodation space 110, so that the safety pipe loop 100 surrounds the periphery of the monitored pipeline, so as to realize the safety monitoring (e.g., strain monitoring) of the monitored pipeline by the safety pipe loop 100.

In some embodiments, the number (or count) of the at least one magnetic test detector may be any integer that is greater than or equal to 1. Further, the number (or count) of the at least one magnetic test detector may be an even number greater than 0. Further, the number (or count) of the at least one magnetic test detector may be 4n, wherein n is an integer number greater than or equal to 1.

In some embodiments, the at least one magnetic test detector may be arranged in the protective shell 2. In some embodiments, the at least one magnetic test detector may be arranged in a ring shape, and the included angles of adjacent magnetic test detectors may be the same or different. For example, the number of magnetic test detectors may be 4n, and the included angle between adjacent magnetic test detectors may be 180°/2n. As another example, the number of magnetic test detectors may be 2n, and the included angle between adjacent magnetic test detectors may be 180°/n.

In some embodiments, the at least one magnetic test detector may be connected in parallel through a data transmission line (e.g., 3 and/or 3' in FIG. 1) and output data through a data transmission interface (e.g., 4 and/or 4' in FIG. 1).

In some embodiments, the protective shell 2 may include an outer layer and an inner layer. When the safety pipe loop 100 is installed on the monitored pipeline, the inner layer of the protective shell 2 is closer to the monitored pipeline than the outer layer of the protective shell 2. The outer layer and the inner layer may form a space configured to accommodate the at least one magnetic test detector. The at least one magnetic test detector may be arranged within the space and between the outer layer and the inner layer of the protective shell 2.

In some embodiments, the outer layer of the protective shell 2 may include a material with larger hardness than the material of the inner layer of the protective shell 2. In some embodiments, the outer layer of the protective shell 2 may include a metal material, and the inner layer of the protective shell 2 may include a non-metallic material. The non-metallic material may include plastic, rubber, ceramic, carbon fiber, or the like, or any combination thereof. In some embodiments, the outer layer of the protective shell 2 may include a non-magnetic material. In some embodiments, the outer layer of the protective shell 2 may include non-magnetic hard alloy. In some embodiments, the outer layer of the protective shell 2 may include a magnetic metal material, and a magnetic shielding material and/or a coating for shield the magnetic field of the magnetic metal material.

In some embodiments, the protective shell 2 may include an upper half-ring 201 and a lower half-ring 202 that are operably connected with each other. In some embodiments, the upper half-ring 201 and the lower half-ring 202 may be symmetrical or asymmetrical with each other. The upper half-ring 201 and the lower half-ring 202 may each include an arc structure. The arc structures of the upper half-ring 201 and the lower half-ring 202 may be oppositely connected to form the protective shell 2 with the accommodation space 110. In some embodiments, the arc structures of the upper half-ring 201 and the lower half-ring 202 may have a same chord length. In some embodiments, the radians (or central angles) of the arc structures of the upper half-ring 201 and the lower half-ring 202 may be the same or different. In some embodiments, the radians (or central angles) of the arc structures of the upper half-ring 201 and the lower half-ring 202 may be within a range of [0°, 360°], [30°, 330°], [45°, 315°], [60°, 300°], [90°, 270°], [120°, 240°], [150°, 210°], [170°, 190°] or [175°, 185°], etc.

For example, as shown in FIG. 1, the upper half-ring 201 and the lower half-ring 202 may each include a semicircular ring structure with a same diameter, so that the upper half-ring 201 and the lower half-ring 202 may be oppositely connected to form the protective shell 2 that has a tubular structure with a circular accommodation space 110.

In some embodiments, the size of the accommodation space 110 may depend on the chord length and the radians (or central angles) of the upper half-ring 201 and the lower half-ring 202. For example, the longer the chord length is, the larger the accommodation space 110 may be. As another example, the larger the radian (or central angle) is, the larger the accommodation space 110 may be. In some embodiments, the chord length and the radians (or central angles) of the arc structures of the upper half-ring 201 and the lower half-ring 202 may be set so that the monitored pipeline is able to pass through the accommodation space 110. For example, the chord length of the upper half-ring 201 and the lower half-ring 202 may be larger than or equal to the major axis (e.g., the diameter) of the monitored pipeline.

In some embodiments, the number (or count) of the magnetic test detectors disposed in the upper half-ring 201 and the number (or count) of the magnetic test detectors disposed in the lower half-ring 202 may be the same or different. For example, the upper half-ring 201 and the lower half-ring 202 may each include a semicircular ring structure with a same diameter. Four magnetic test detectors may be disposed in the upper half-ring 201 and three magnetic test detectors may be disposed in the lower half-ring 202. The included angle between any two adjacent magnetic test detectors in the upper half-ring 201 may be 60 degrees. The included angle between any two adjacent magnetic test detectors in the lower half-ring 202 may be 45 degrees. The included angle between a magnetic test detector in the upper half-ring 201 and its adjacent magnetic test detector in the lower half-ring 202 may be 45 degrees. As another example, as shown in FIG. 1, 8 magnetic test detectors may be disposed within the protective shell 2, wherein 4 of the 8 magnetic test detectors may be disposed within the upper half-ring 201 and the rest 4 of the 8 magnetic test detectors may be disposed within the lower half-ring 202. The included angle between any two adjacent detectors of the 8 magnetic test detectors may be 45 degrees.

In some embodiments, the magnetic test detectors arranged in the upper half-ring 201 may be connected in parallel through a first data transmission line 3 and output data through a first data transmission interface 4. The magnetic test detectors arranged in the lower half-ring 202 may be connected in parallel through a second data transmission line 3' and output data through a second data transmission interface 4'. In some embodiments, the magnetic test detectors arranged in the upper half-ring 201 and the lower half-ring 202 may or may not communicate.

In some embodiments, the upper half-ring 201 may include a first protective shell outer layer 203 and a first protective shell inner layer 204. The lower half-ring 201 may include a second protective shell outer layer 203' and a second protective shell inner layer 204'. In some embodiments, the outer layer of the protective shell 2 may include the first protective shell outer layer 203 of the upper half-ring 201 and the second protective shell outer layer 203' of the lower half-ring 202. The inner layer of the protective shell 2 may include a second protective shell inner layer 204 of the upper half-ring 201 and a second protective shell inner layer 204' of the lower half-ring 202. In some embodiments, the materials of the first protective shell outer layer 203 of the upper half-ring 201 and the second protective shell outer layer 203' of the lower half-ring 202 may be the same or different. In some embodiments, the materials of the first protective shell inner layer 204 of the upper half-ring 201 and the second protective shell inner layer 204' of the lower half-ring 202 may be the same or different.

In some embodiments, the connection manner of the upper half-ring 201 and the lower half-ring 202 may include a non-detachable connection. For example, the upper half-ring 201 and the lower half-ring 202 may be integrally formed. As another example, the upper half-ring 201 and the lower half-ring 202 may be welded, riveted, and/or stuck. The safety pipe loop designed in this way may be sleeved on the monitored pipeline before the monitored pipeline is buried underground.

In some embodiments, the connection manner of the upper half-ring 201 and the lower half-ring 202 may include a detachable connection. The detachable connection may include a pin connection, a key connection, a threaded connection, a buckle connection, or the like, or any combination thereof. In some embodiments, the upper half-ring 201 may include at least one end along the extending direction of the arc structure of the upper half-ring 201, and the lower half-ring 202 may include at least one end along the extending direction of the arc structure of the lower half-ring 202. For example, as shown in FIG. 1, the upper half-ring 201 may include the A end and the B end along the extending direction of the semicircular ring structure of the upper half-ring 201, and the lower half-ring 202 may include the A' end and the B' end along the extending direction of the semicircular ring structure of the lower half-ring 202.

In some embodiments, at least one end of the upper half-ring 201 may be detachably connected with at least one end of the lower half-ring 202. For example, the A end of the upper half-ring 201 may be detachably connected with the A' end of the lower half-ring 202, and/or the B end of the upper half-ring 201 may be detachably connected with the B' end of the lower half-ring 202.

In some embodiments, one end of the upper half-ring 201 may be in movable connection (e.g., a hinged connection) with one end of the lower half-ring 202, and the other ends of the upper half-ring 201 and the lower half-ring 202 may be detachably connected. Under the movable connection, the upper half-ring 201 may be movable relative to the lower half-ring 202. For example, the A end of the upper half-ring 201 maybe hinged with the A' end of the lower half-ring 202, and the B end of the upper half-ring 201 may be detachably connected with the B' end of the lower half-ring 202. For example, the B end of the upper half-ring 201 may be provided with a lug 5, and the B' end of the lower half-ring 202 may be provided with a lugs 5'. The B end of the upper half-ring 201 and the B' end of the lower half-ring 202 may be detachably connected through the lug 5 and the lug 5'. For example, the lug 5 and the lug 5' may be detachably connected by a bolt 6.

In some embodiments, all ends of the upper half-ring 201 and the lower half-ring 202 may be detachably connected. For example, as shown in FIG. 1, the A end of the upper half-ring 201 may be detachably connected with the A' end of the lower half-ring 202, the B end of the upper half-ring 201 may be detachably connected with the B' end of the lower half-ring 202. For example, as shown in FIG. 1, the A end of the upper half-ring 201 may be provided with a lug 8, the B end of the upper half-ring 201 may be provided with a lug 5, the A' end of the lower half-ring 202 may be provided with a lug 8', and the B' end of the lower half-ring 202 may be provided with a lug 5'. The A end of the upper half-ring 201 may be detachably connected with the A' end of the lower half-ring 202 through the lug 8 and the lug 8', and the B end of the upper half-ring 201 may be detachably connected with the B' end of the lower half-ring 202 through the lug 5 and the lug 5'. For example, the lug 5 and the lug 5' may be detachably connected by a bolt 6, and the lug 8 and the lug 8' may be detachably connected by a bolt 6'.

The safety pipe loop provided in this way does not require on-site assembly of components of the safety pipe loop, such as the at least one magnetic test detector, data cables, protective accessories (e.g., the protective shell 2) of the safety pipe loop, etc., and may shorten the on-site installation time of the safety pipe loop. It should be noted that, in addition to the configurations of the safety pipe loop described above configured to facilitate the installation of the safety pipe loop on the monitored pipeline, other configurations of the safety pipe loop that are configured to facilitate the installation of the safety pipe loop on the monitored pipeline can also be applied to the safety pipe loop provided in the present disclosure.

In some embodiments, in order to prevent the inner layer of the protective shell 2 from being damaged due to excessive twisting of the nut of the bolt 6 and/or 6', one or more middle members may be provided between the upper half-ring 201 and the lower half-ring 202. In some embodiments, the material of the middle member may include rubber, plastic, metal, sponge, cloth, silica gel, paper, wood, or the like, or any combination thereof. In some embodiments, the middle member may be a flat piece, a block, or the like.

For example, as shown in FIG. 1, a rubber gasket 7 may be provided between the A end of the upper half-ring 201 and the A' end of the lower half-ring 202, and/or a rubber gasket 7' may be provided between the B end of the upper half-ring 201 and the B' end of the lower half-ring 202.

It should be noted that the above description of the therapeutic device 110 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
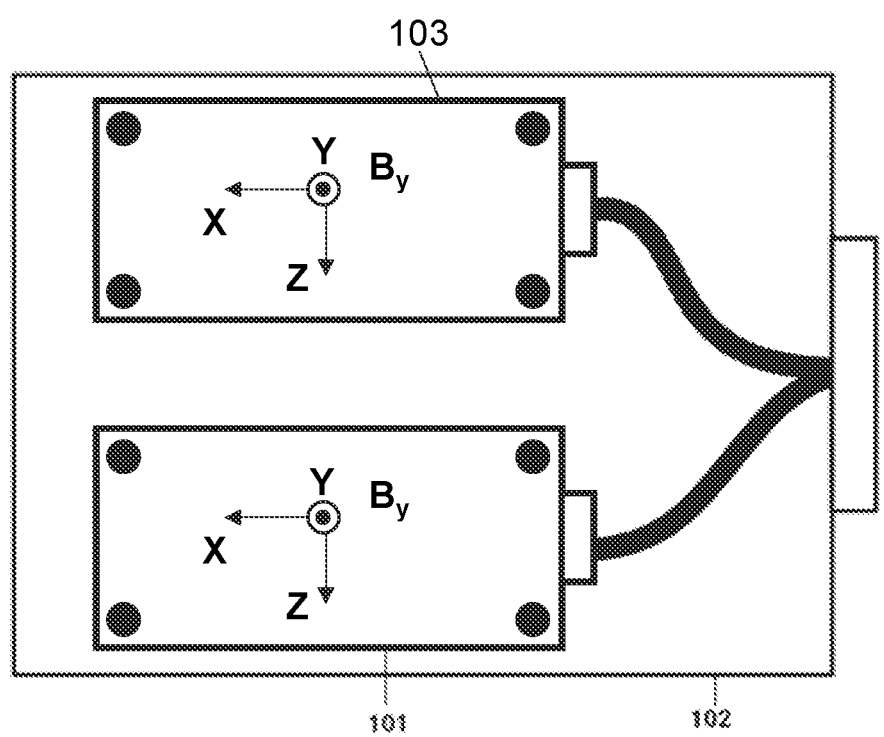
FIG. 2 is a schematic structural diagram illustrating an exemplary magnetic test detector according to some embodiments of the present disclosure.

FIG. 2 is a schematic structural diagram illustrating an exemplary magnetic test detector according to some embodiments of the present disclosure. In some embodiments, at least one magnetic test detector of the safety pipe loop 100 may be configured according to the magnetic test detector 200 in FIG. 2.

In some embodiments, the magnetic test detector 200 may include at least one sensor (e.g., 101 and/or 103) and a housing 102 for protecting the at least one sensor. The at least one sensor may be configured to detect a normal magnetic induction intensity of the outer circumference surface of the monitored pipeline. The at least one sensor may be disposed inside the housing 102. In some embodiments, the magnetic test detector 200 may include one or two sensors (e.g., the sensors 101 and 103 shown in FIG. 2). In some embodiments, the housing 102 may include a non-metallic material. The non-metallic material may include plastic, rubber, ceramic, carbon fiber, or the like, or any combination thereof. In some embodiments, the at least one sensor may include a single-axis fluxgate sensor. Optionally, the at least one sensor may be a single-axis low-field fluxgate sensor capable of testing uT-level magnetic induction intensity. It should be noted that in addition to the single-axis fluxgate sensor, the present disclosure may also use other sensors, such as a three-axis fluxgate sensor. The present disclosure only needs to test the normal magnetic induction intensity during monitoring, so the single-axis fluxgate sensor may meet the demand and save costs. In some embodiments, when the number (or count) of the at least one sensor is two, one is a spare sensor and the other is actually used to detect the normal magnetic induction intensity, which is more efficient for the actual on-site engineering. For example, when the sensor that is actually used to detect the normal magnetic induction intensity is detected to be broken, the spare sensor may be enabled to replace the broken sensor to detect the normal magnetic induction intensity. In some embodiments, when active excitation is required to be applied to the monitored pipeline, the magnetic test detector 200 may include at least one sensor configured to detect the normal magnetic induction intensity and at least one excitation device configured to apply active excitation to the monitored pipeline.

For example, as shown in FIG. 2, when the magnetic test detector 200 is installed at a monitoring location on the outer circumference surface of the monitored pipeline, the x direction in FIG. 2 may be the extending direction (also referred to as the axial direction) of the monitored pipeline, the y direction (perpendicular to the paper) may be the normal direction corresponding to the magnetic test detector 200 (e.g., a certain radial direction of the monitored pipeline that is perpendicular to the outer circumference surface of the monitored pipeline at the monitoring location), and the z direction may be perpendicular to the x direction and the y direction. The magnetic test detector 200 may be configured to monitor the normal magnetic induction intensity By at the monitoring location on the outer circumference surface of the monitored pipeline.

In some embodiments, the non-metallic materials used in the inner layer (e.g., the first protective shell inner layer 204 and/or the second protective shell inner layer 204') of the protective shell 2 and the housing 102 may be the same, such as a carbon fiber material. In some embodiments, the non-metallic materials used in the inner layer (e.g., the first protective shell inner layer 204 and/or the second protective shell inner layer 204') of the protective shell 2 and the housing 102 may be different. For example, the inner layer of the protective shell 2 may include a ceramic material, and the housing 102 may include a carbon fiber material. It should be noted that the materials of the inner layer of the protective shell 2 and the housing 102 of the magnetic test detector 200 described in the present disclosure are not limited to the above two non-metallic materials, and may be other non-metallic materials, such as rubber, plastic, etc. Compared with non-metallic materials such as plastic or ceramics, the carbon fiber material may have better heat dissipation and durability.

It should be noted that the above description of the therapeutic device 110 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, another aspect of the present disclosure provides a method for strain monitoring of mountainous pipelines using the safety pipe loop 100. The method may include operations S1-S7.

In S1, for each of the at least one magnetic test detector of the safety pipe loop 100, a correction factor may be determined. In some embodiments, the correction factor of a magnetic test detector (e.g., the magnetic test detector 1) may be determined based on S11-S15. In some embodiments, the correction factor(s) of the other magnetic test detector(s) of the safety pipe loop 100 may also be determined based on S11-S15.

In S11, a flat test piece (for example, the flat test piece 12 shown in FIG. 3) may be made using a same material as the monitored pipeline (for example, the monitored pipeline 11 in FIG. 4), and then the flat test piece 12 may be clamped on a clamp of a tensile testing machine. In some embodiments, an excitation device (e.g., such as a Helmholtz coil) may be applied to strengthen the excitation of the flat test piece 12 and improve the quality of magnetic signal acquisition.

Figure 3:
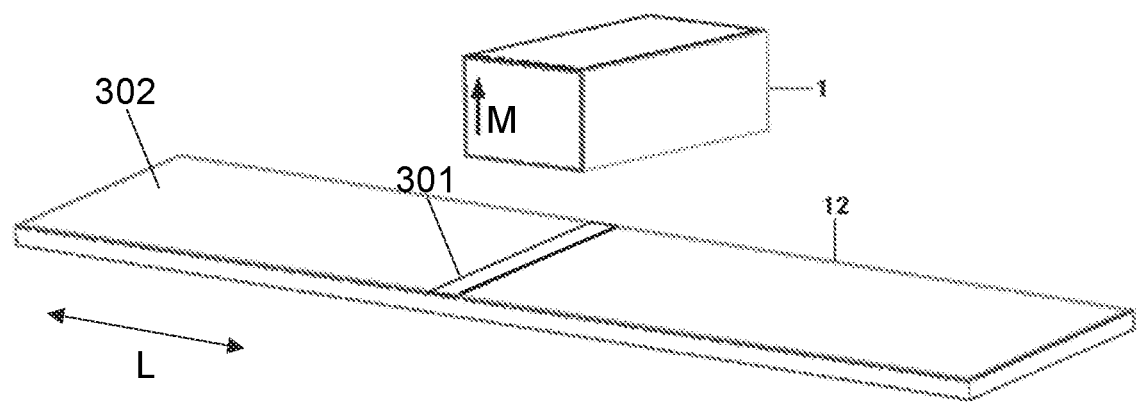
FIG. 3 is a flowchart illustrating an exemplary process for determining a correction factor of a magnetic test detector according to some embodiments of the present disclosure.

In S12, as shown in FIG. 3, the magnetic test detector 1 may be fixed and installed directly above a measurement line 301 of the flat test piece 12. A magnetic field test direction M of the magnetic test detector 1 may be perpendicular to a loading direction of the flat test piece 12. The loading direction may be a tensile direction of the flat test piece 12, and further, a length direction (e.g., an extending direction L of the flat test piece 12 as shown in FIG. 3) of the flat test piece 12. In some embodiments, the magnetic field test direction M of the magnetic test detector 1 may be perpendicular to a surface (e.g., the surface 302 in FIG. 3) of the flat test piece 12 that has a maximum area among other surfaces of the flat test piece 12.

In S13, the tensile testing machine may be turned on to perform a cyclic loading process including a plurality of loading operations to stretch the flat test piece 12 along the length direction L of the flat test piece 12. During the cyclic loading process within the range of elastic deformation of the flat test piece 12, a plurality of test values of the normal magnetic induction intensity (e.g., along the direction M) of the surface 302 of the flat test piece 12 may be obtained by the magnetic test detector 1. A change curve of change values of the normal magnetic induction intensity may be determined by processing the plurality of test values of the normal magnetic induction intensity.

During the entire loading process, the magnetic test detector 1 may be in a ferromagnetic component environment. The test value of the magnetic test detector 1 obtained in the ith loading operation of the cyclic loading process may include a magnetic signal $P_i$ of the flat test piece 12, a magnetic signal $F_i$ caused by the ith loading operation, and a background magnetic signal $E_i$. In the loading process, the magnetic measurement position (e.g., the measurement line 301) of the flat test piece 12 may be close to a fixture part, and the size change range of the flat test piece 12 may be small, so the background magnetic signal $E_i$ and the magnetic signal $P_i$ of the flat test piece 12 may be almost unchanged, and the change value corresponding to the ith loading operation may be $\Delta B = F_{i+1} - F_i$.

In S14, after the cyclic loading process is completed, an actual strain curve of the flat test piece 12 during the cyclic loading process may be obtained from an upper computer of the tensile testing machine.

In S15, a value of the correction factor of the magnetic test detector 1 may be determined by comparing the change curve with the actual strain curve. In some embodiments, a processed curve may be obtained by multiplying the change curve by the determined correction factor. The consistency between the processed curve and the actual strain curve may be higher than the consistency between the change curve and the actual strain curve.

In S2, the at least one magnetic test detector each of which is provided with the corresponding correction factor may be assembled, so as to obtain the safety pipe loop 100.

Figure 4:
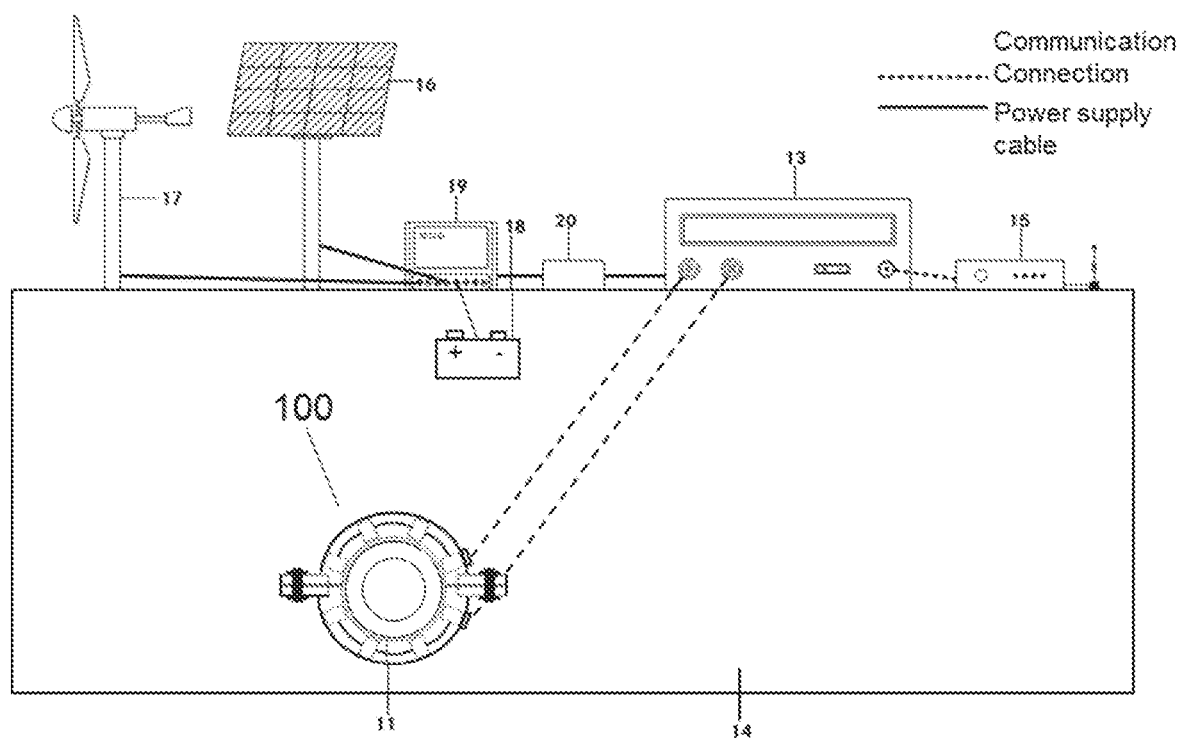
FIG. 4 is a schematic structural diagram illustrating an exemplary safety monitoring system according to some embodiments of the present disclosure.

In S3, the safety pipe loop 100 may be installed on the monitored pipeline 11, and one or more supporting devices of the safety pipe loop 100 may be installed. As shown in FIG. 4, the one or more supporting devices may include a data collector 13. The number (or count) of communication channels of the data collector 13 may be the same as the number (or count) of the at least one magnetic test detector in the safety pipe loop 100. In some embodiments, if an external magnetic field (e.g., the excitation device illustrated in S11) is applied to the flat test piece 12 during a process for determining the correction factor of the at least one magnetic test detector in the safety pipe loop 100, it is also necessary to install a weak magnetic field excitation device on the safety pipe loop 100, the excitation intensity of which may be consistent with the excitation intensity in the process for determining the correction factor.

In some embodiments, as shown in FIG. 4, in a safety monitoring system 400, the monitored pipeline 11 may be buried in the soil 14. In addition to the data collector 13, the one or more supporting devices may further include an industrial router 15, a solar panel 16, a wind turbine 17, a storage battery 18, a power supply controller 19, an inverter 20, a data cable, a power supply cable, or the like, or any combination thereof. The data collector 13, the industrial router 15, and the data cable may be used for real-time collection and remote transmission (e.g., through a network such as wireless connection or wired connection) of monitoring data from the safety pipe loop 100 that is installed on the monitored pipeline 11. The solar panel 16, the wind turbine 17, the storage battery 18, the power supply controller 19, the inverter 20, and the power supply cable may be used for long-term stable power supply of the safety monitoring system 400. After the installation of the safety pipe loop 100 on the monitored pipeline 11 is completed, a user may log in a cloud platform of the safety monitoring system 400 through an online monitoring software to check whether the magnetic measurement data of the monitored pipeline 11 monitored by the safety pipe loop 100 may be received normally. The safety pipe loop 100 may monitor, in real time, the normal magnetic induction intensity values at one or more monitor positions of the at least one magnetic test detector of the safety pipe loop 100 on the outer circumference surface of the monitored pipeline 11. The monitoring data (e.g., the real-time normal magnetic induction intensity values tested by the safety pipe loop 100) may be transmitted to the cloud platform through the data collector 13 and the industrial router 15. A user may log in the cloud platform through the online monitoring software to view the monitoring data of the monitored pipeline 11.

In some embodiments, the operation S1 may be omitted. For example, the purpose of determining the correction factor for each of the at least one magnetic test detector of the safety pipe loop 100 may be to improve the accuracy of the at least one magnetic test detector of detecting the normal magnetic induction intensity. When the precision of the at least one magnetic test detector of the safety pipe loop 100 is high enough or acceptable, the operation S1 may be omitted.

In addition, the operation S2 may also be omitted. For example, an assembled safety pipe loop 100 may be directly installed on the monitored pipeline 100.

In some embodiments, after acquiring the normal magnetic induction intensity values from the safety pipe loop 100, the data collector 13 may implement pipeline safety warning of the monitored pipeline 11 by performing operations S4-S7.

In S4, for each of the at least one magnetic test detector of the safety pipe loop 100, a change value (e.g., corresponding to a current test time point) of the normal magnetic induction intensity of the outer circumference surface of the monitoring pipeline 11 may be obtained based on values of the normal magnetic induction intensity monitored by the magnetic test detector in a certain time period. For example, the change value may be a difference between two values of the normal magnetic induction intensity corresponding to two adjacent test time points (e.g., a current test time point and a previous test time point). The change value may be converted into a local longitudinal strain value of the monitoring location of the magnetic test detector based on the correction factor of the magnetic test detector. The local longitudinal strain value of the monitoring location of the magnetic test detector may refer to a value of the longitudinal strain of the monitoring location (e.g., at the outer circumference surface of the monitored pipeline) of the magnetic test detector. The longitudinal strain may refer to the strain along the axial direction of the monitored pipeline. For example, the change value may be converted into the local longitudinal strain value of the monitoring location of the magnetic test detector based on Equation (1) below:

$$E^* \varepsilon_L = f_y^* \Delta B_y \qquad (1),$$

wherein E is the elastic modulus of the monitored pipeline 11, the unit of which is MPa; $\varepsilon_L$ is the local longitudinal strain value, the unit of which is με; $f_y$ is the correction factor, dimensionless; and $\Delta B_y$ is the change value of the normal magnetic induction intensity, the unit of which is nT.

In some embodiments, when operation S1 is omitted, $f_y$ in Equation (1) may be equal to 1.

In S5, an overall axial strain value of a section of the monitored pipeline 11 may be determined based on the local longitudinal strain value corresponding to the at least one magnetic test detector. The overall axial strain value of the monitored pipeline 11 may refer to a strain along the axial direction of the monitored pipeline 11. In some embodiments, the overall axial strain value of a section of the monitored pipeline 11 may be determined based on a sum of the local longitudinal strain value corresponding to the at least one magnetic test detector. The sum of the local longitudinal strain value corresponding to the at least one magnetic test detector may be positively related to the overall axial strain value. In some embodiments, the overall axial strain value may be determined based on a hoop strain of the section of the monitored pipeline 11. The hoop strain of the monitored pipeline 11 may refer to a strain of the monitored pipeline 11 along the circumference direction of the monitored pipeline 11. The hoop strain may be negatively related to the overall axial strain value. In some embodiments, the overall axial strain value may be determined based on Equations (2) and (3) below:

$$\varepsilon_a = \frac{1}{N}\sum_{i=1}^{N}\varepsilon_{Li} - \gamma * \varepsilon_{hp}, \text{ and} \quad (2)$$

$$\varepsilon_{hp} = \frac{PD}{2\delta E}, \quad (3)$$

wherein $\varepsilon_a$ is the overall axial strain value, the unit of which is με; N is the number (or count) of the at least one magnetic test detector in the safety pipe loop 100, N is an integer greater than 0, dimensionless; $\varepsilon_{Li}$ is the local longitudinal strain value of the ith magnetic test detector of the N magnetic test detector(s), the unit of which is με; γ is the Poisson coefficient of the monitored pipeline 11, dimensionless; $\varepsilon_{hp}$ is the hoop strain, the unit of which is με; P is the operating pressure of the monitored pipeline 11, the unit of which is MPa; D is the diameter of the monitored pipeline 11, the unit of which is mm; δ is the wall thickness of the monitored pipeline 11, the unit of which is mm.

In some embodiments, the operating pressure of the monitored pipeline 11 may refer to a pressure applied on the monitored pipeline 11 caused by the soil 14 surrounding the monitored pipeline 11 and/or an object (e.g., water, oil, gas, etc.) passing through the monitored pipeline 11. In some embodiments, the operating pressure P of the monitored pipeline 11 may be an average operating pressure during a time period (e.g., from a previous test time point to the current test time point) or an instant operating pressure corresponding to a time point (e.g., the current test time point).

In some embodiments, if the wall thickness of the monitored pipeline 11 is uniform along the axial direction of the monitored pipeline 11, the wall thickness of the monitored pipeline 11 may be the uniform wall thickness. In some embodiments, if the wall thickness of the monitored pipeline 11 is not uniform along the axial direction of the monitored pipeline 11, the wall thickness of the monitored pipeline 11 may be the maximum value of the wall thickness, the minimum value of the wall thickness, an average value of the maximum value and the minimum value of the wall thickness, or the wall thickness at the installed location of the safety pipe loop 100 on the monitored pipeline 11.

In some embodiments, if the diameter of the monitored pipeline 11 is uniform along the axial direction of the monitored pipeline 11, the diameter of the monitored pipeline 11 may be the uniform diameter. In some embodiments, if the diameter of the monitored pipeline 11 is not uniform along the axial direction of the monitored pipeline 11, the diameter of the monitored pipeline 11 may be the maximum value of the diameter, the minimum value of the diameter, an average value of the maximum value and the minimum value of the diameter, or the diameter at the installed location of the safety pipe loop 100 on the monitored pipeline 11.

In S6, an axial strain warning threshold of the monitored pipeline 11 may be determined. In some embodiments, the axial strain warning threshold may be determined based on the elastic modulus of the monitored pipeline 11. The axial strain warning threshold may be negatively related to the elastic modulus of the monitored pipeline 11. In some embodiments, the axial strain warning threshold may be determined based on the yield strength of the monitored pipeline 11. The axial strain warning threshold may be positively related to the yield strength of the monitored pipeline 11. In some embodiments, the axial strain warning threshold may be determined based on the hoop strain of the monitored pipeline 11. The axial strain warning threshold may be negatively related to the hoop strain of the monitored pipeline 11. In some embodiments, the axial strain warning threshold may be determined based on Equation (4) below:

$$\varepsilon_T = \frac{\sigma_s}{2.2E\eta}, \quad (4)$$

wherein $\varepsilon_T$ is the axial strain warning threshold, the unit of which is με; $\sigma_s$ is the yield strength of the monitored pipeline 11, the unit of which is MPa; and η is a safety factor, dimensionless. Optionally, the safety factor η=1.5~2.5.

In S7, the overall axial strain value may be compared with the axial strain warning threshold, and a monitoring strategy may be determined based on the comparison result and a signal characteristic of the at least one magnetic test detector of the safety pipe loop 100. In some embodiments, Table 1 indicating a classification warning indicator may be determined based on a signal characteristic of the safety pipe loop 100 and a comparison result between the overall axial strain value and the axial strain warning threshold.

TABLE 1

| | Classification warning indicator | | |
|---|---|---|---|
| | | Monitoring Strategy | |
| $\varepsilon_a$ | Signal Characteristic | Circumferential Weld | Pipeline Body |
| $<\varepsilon_T$ | separated state | monitored | used normally |
| | similar trend state | used normally | |
| $\geq\varepsilon_T$ | separated state | repaired immediately | monitored |
| | similar trend state | monitored | |

As shown in Table 1, the monitoring strategy may include at least one of: a strategy that in response to determining that the overall axial strain value is less than the axial strain warning threshold and the signal characteristic is a separated state, a circumferential weld of the monitored pipeline 11 is monitored, and a pipeline body of the monitored pipeline 11 is used normally; a strategy that in response to determining that the overall axial strain value is less than the axial strain warning threshold and the signal characteristic is a similar trend state, the circumferential weld of the monitored pipeline 11 and the pipeline body of the monitored pipeline 11 are used normally; a strategy that in response to determining that the overall axial strain value is greater than or equal to the axial strain warning threshold and the signal characteristic is a separated state, the circumferential weld of the monitored pipeline 11 is repaired immediately, and the pipeline body is monitored; and a strategy that in response to determining that the overall axial strain value is greater than or equal to the axial strain warning threshold and the signal characteristic is a similar trend state, the circumferential weld of the monitored pipeline 11 and the pipeline body of the monitored pipeline 11 are monitored.

In some embodiments, for each of the at least one magnetic test detector of the safety pipe loop 100, an intensity curve indicating a relation between the real-time values of the normal magnetic induction intensity monitored by the magnetic test detector and the corresponding test time points may be obtained. The intensity curve may indicate a change trend of the real-time values of the normal magnetic induction intensity monitored by the magnetic test detector over time. If the intensity curve of the at least one magnetic test detector of the safety pipe loop 100 is similar to each other, the signal characteristic may be a similar trend state. If there is a big difference between the intensity curve of the at least one magnetic test detector of the safety pipe loop 100, the signal characteristic may be a separated state. For example, a similarity degree may be determined based on an average value of a plurality of differences, each of which is between the values of the normal magnetic induction intensity that correspond to a same test time point and are monitored by different magnetic test detectors of the safety pipe loop 100. In response to determining that the similarity degree is smaller than a similarity threshold, the signal characteristic may be determined as a similar trend state. In response to determining that the similarity degree is larger than or equal to the similarity threshold, the signal characteristic may be determined as a separated state. The method for distinguishing whether the signal characteristic is the separated state or the similar trend state is an existing technology known to those skilled in the art, and will not be repeated here.

Figure 5:
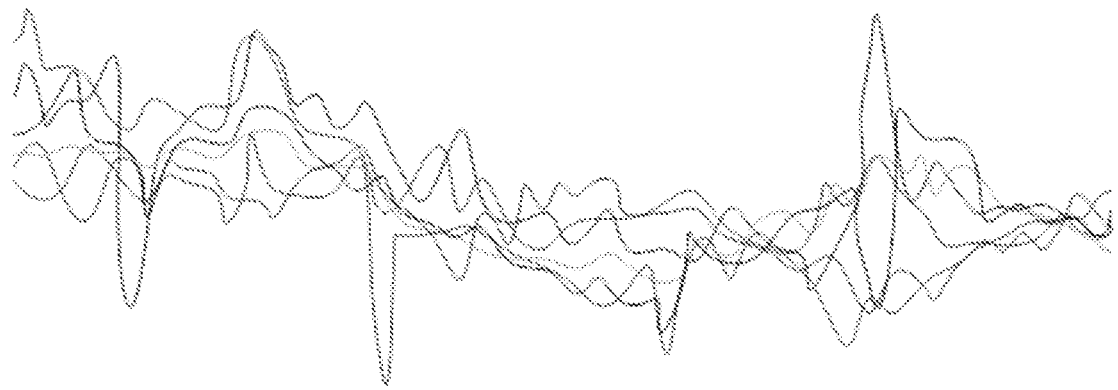
FIG. 5 is a schematic diagram illustrating an exemplary signal characteristic of a similar trend state according to some embodiments of the present disclosure.

FIG. 5 shows 6 intensity curves respectively corresponding to 6 magnetic test detectors. As shown in FIG. 5, the 6 intensity curves are similar to each other. Accordingly, the signal characteristic of the 6 magnetic test detectors may be a similar trend state.

Figure 6:
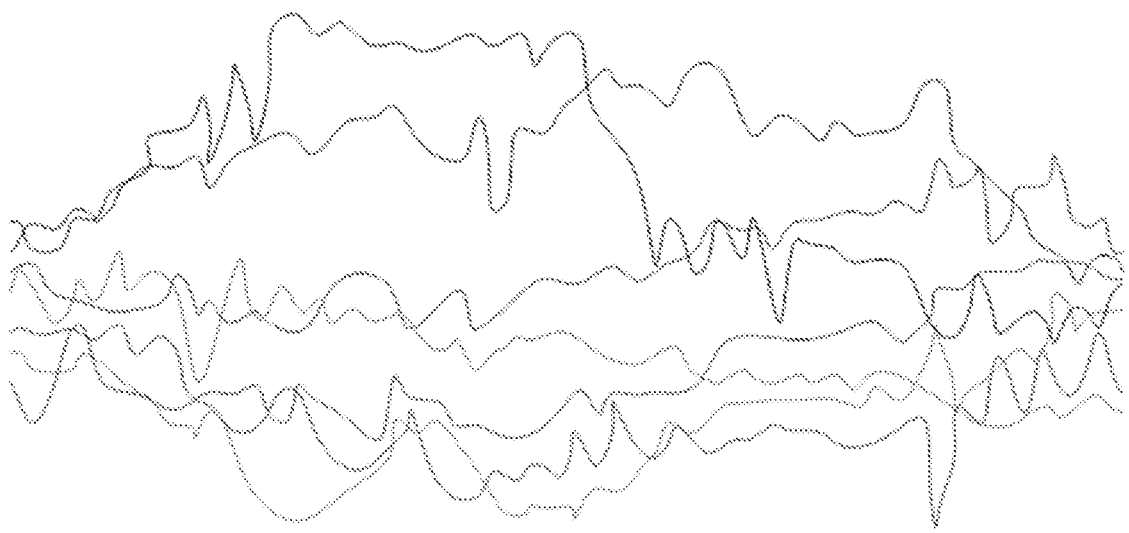
FIG. 6 is a schematic diagram illustrating an exemplary signal characteristic of a separated state according to some embodiments of the present disclosure.

FIG. 6 shows 7 intensity curves respectively corresponding to 7 magnetic test detectors. As shown in FIG. 6, there is a big difference between the 7 intensity curves. Accordingly, the signal characteristic of the 7 magnetic test detectors may be a separated state.

In some embodiments, the data collector 13 may generate prompt information corresponding to the monitoring strategy. For example, the data collector 13 may prompt information indicating that the monitored pipeline 11 (e.g., the circumferential weld and/or the pipeline body) is required to be monitored, used normally, or repaired immediately. The prompt information may be presented in the form of pictures, videos, texts, sounds, etc. For example, when determining that the monitored pipeline 11 needs immediate repair, the data collector 13 may generate an alarm voice to give a warning. As another example, when determining that the monitored pipeline 11 needs immediate repair, the data collector 13 may generate a prompt message and send, via a network (e.g., wireless connection), the prompt information to a user terminal (for example, a mobile phone) to remind the user that the monitored pipeline 11 needs immediate repair.

In some embodiments, for the purpose of illustration, a target mountainous pipeline is taken as an example. The material of the target mountainous pipeline is X80 steel. The safety pipe loop 100 illustrated above may be installed on the target mountainous pipeline. There are 4 magnetic test detectors in the upper half-ring 201 and the lower half-ring 202 of the safety pipe loop 100, respectively. The total number of magnetic test detectors is 8, and the angle between any two adjacent magnetic test detectors is 45°.

Figure 7:
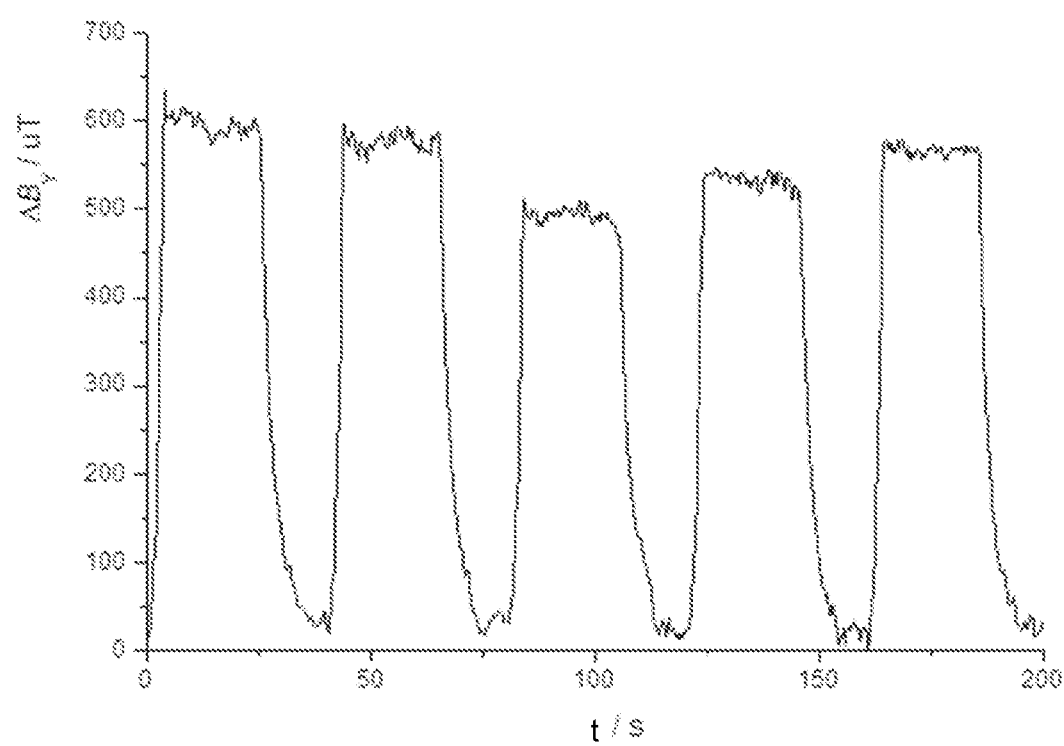
FIG. 7 is a schematic diagram illustrating an exemplary change curve of change values of a normal magnetic induction intensity according to some embodiments of the present disclosure.

FIG. 7 is a schematic diagram illustrating an exemplary change curve of change values of a normal magnetic induction intensity (e.g., the magnetic induction intensity along the direction M in FIG. 3) of a magnetic test detector obtained based on operation S13. As shown in FIG. 7, the horizontal axis represents the time, and the vertical axis represents the change values of the normal magnetic induction intensity. The change curve may indicate the change trend of the change values of the normal magnetic induction intensity over time.

Figure 8:
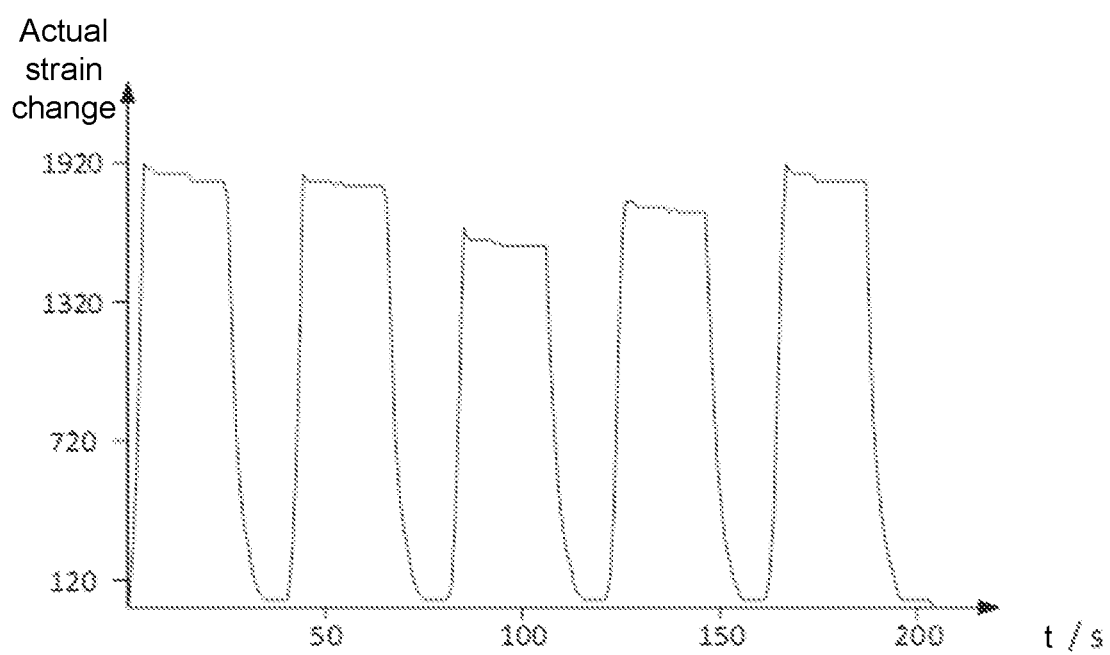
FIG. 8 is a schematic diagram illustrating an exemplary actual strain curve according to some embodiments of the present disclosure.

FIG. 8 is a schematic diagram illustrating an exemplary actual strain curve obtained based on operation S14. As shown in FIG. 8, the horizontal axis represents the time, and the vertical axis represents the actual strain change values of the normal magnetic induction intensity of the flat test piece 12. The actual strain curve may indicate the change trend of the actual strain values of the normal magnetic induction intensity over time.

The correction factor of the magnetic test detector may be determined by comparing the two curves in FIG. 7 and FIG. 8. The correction factor(s) of other magnetic test detector(s) may be determined by repeating this procedure. In some embodiments, a processed curve may be obtained by multiplying the curve in FIG. 7 by the determined correction factor. The consistency between the processed curve and the curve in FIG. 8 may be higher than the consistency between the curves in FIG. 7 and FIG. 8.

Then, a local longitudinal strain value of each magnetic test detector may be determined based on Equation (1). The overall axial strain value may be determined based on Equations (2) and (3). The results of the local longitudinal strain value and the overall axial strain value are shown in Table 2.

TABLE 2

Monitoring results of a target mountainous pipeline

| Period | Local longitudinal strain value of magnetic test detector | | | | | | | | Overall axial strain value ($\mu\varepsilon$) |
|---|---|---|---|---|---|---|---|---|---|
| | 1# | 2# | 3# | 4# | 5# | 6# | 7# | 8# | |
| Day 15 strain ($\mu\varepsilon$) | 277 | 246 | 809 | 348 | 478 | 234 | 130 | 331 | 98 |
| Day 30 strain ($\mu\varepsilon$) | 462 | 154 | 764 | 490 | 454 | 431 | 291 | 208 | 149 |
| Day 45 strain ($\mu\varepsilon$) | −32 | 176 | 618 | 410 | 430 | 236 | 218 | 230 | 27 |
| Day 60 strain ($\mu\varepsilon$) | 394 | 313 | 582 | 470 | 434 | 20 | 27 | 182 | 46 |
| Day 75 strain ($\mu\varepsilon$) | 468 | 181 | 180 | 338 | 678 | 470 | 663 | 342 | 157 |

Finally, the axial strain warning threshold determined based on Equation (4) is 491$\mu\varepsilon$. For each period in Table 2, the overall axial strain value may be compared with the axial strain warning threshold. According to the signal characteristic of the magnetic test detectors and the comparison result, a corresponding monitoring strategy may be selected from Table 1.

The pipeline strain magnetic monitoring method based on the safety pipe loop of the present disclosure may continuously monitor the safety state data of mountainous pipelines. Through the magnetic signal calibration method, the measured normal magnetic induction change value $\Delta B_y$ may be quantitatively converted into the longitudinal strain value $\varepsilon_L$, which is used to evaluate the mechanical safety state of the pipeline, with high efficiency and strong reliability. The pipeline strain magnetic monitoring method adopts a calibration model and an axial total strain regression analysis method to directly obtain the axial strain value Ea of the pipeline, which may accurately identify the mechanical safety state of the pipeline. In addition, through the signal characteristic of the multi-channel normal magnetic induction, it is possible to directly determine whether the monitored pipe section is elastically bent and deformed, and timely discover the failure risk of the pipe girth weld, effectively ensuring the safe operation of the pipeline. Furthermore, the safety pipe loop of the present disclosure is directly installed on the outer circumference surface of the pipeline. Generally, the magnetic field strength of the pipeline collected at a close distance is much higher than the background magnetic field, and the degree of interference from external noise signals is relatively small. Therefore, the test data may more accurately reflect the safety status of the pipeline. In some embodiments, the safety pipe loop may adopt an integrated design structure, which may assemble sensors, data cables, and protective accessories without on-site welding, and shorten the on-site installation cycle. Traditional strain sensors need to be bonded to the surface of the metal surface of the pipeline. For the safety pipe loop of the present disclosure, bolts and nuts may be used to make the safety pipe loop fixed on the pipeline. There is no need to peel off the anti-corrosion layer of the pipeline and process the surface of the pipeline, which saves installation costs.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for strain monitoring of mountainous pipelines, comprising:
    determining a correction factor of each of a plurality of magnetic test detectors;
    assembling the plurality of magnetic test detectors each of which is provided with the corresponding correction factor, so as to obtain a safety pipe loop for strain monitoring of mountainous pipelines;
    wherein the correction factor is determined by operations including:
    making a flat test piece using a same material as a monitored pipeline;
    clamping the flat test piece on a clamp of a tensile testing machine;
    fixing the magnetic test detector directly above a measurement line of the flat test piece, a magnetic field test direction of the magnetic test detector being consistent with a loading direction of the flat test piece;
    turning on the tensile testing machine to perform a cyclic loading process to stretch the flat test piece;
    obtaining values of a normal magnetic induction intensity of a surface of the flat test piece within a range of elastic deformation of the flat test piece during the cyclic loading process;
    determining a change curve of change values of the normal magnetic induction intensity by processing the values of the normal magnetic induction intensity of the surface of the flat test piece;
    obtaining an actual strain curve of the flat test piece during the cyclic loading process from an upper computer corresponding to the tensile testing machine; and
    determining a value of the correction factor by comparing the change curve with the actual strain curve;
    wherein the safety pipe loop for strain monitoring of mountainous pipelines includes the plurality of magnetic test detectors and a protective shell for protecting the plurality of magnetic test detectors, a count of the plurality of magnetic test detectors is set to 4n, n is an integer number greater than or equal to 1, an angle between any two adjacent detectors of the plurality of magnetic test detectors is 180°/2n, at least two of the plurality of magnetic test detectors are connected in parallel through a data transmission line and output data through a data transmission interface, an outer layer of the protective shell includes non-magnetic hard alloy, and an inner layer of the protective shell includes non-metallic materials;
    installing the safety pipe loop on the monitored pipeline;
    installing a supporting device of the safety pipe loop, the supporting device including a data collector;
    for each of the plurality of magnetic test detectors of the safety pipe loop, converting, based on the correction factor of the magnetic test detector, the change value into a local longitudinal strain value of a monitoring location on the monitored pipeline corresponding to the magnetic test detector, the change value being obtained based on normal magnetic induction intensity values of a surface of the monitored pipeline, the normal magnetic induction intensity values being collected by the data collector from the safety pipe loop, the change value is converted into the local longitudinal strain value based on:

$$E\varepsilon_L = f_y \cdot \Delta B_y,$$

wherein E is an elastic modulus of a material of the monitored pipeline, a unit of which is MPa; $\varepsilon_L$ is the local longitudinal strain value, a unit of which is µε; fy is the correction factor, which is dimensionless; and $\Delta B_y$ is the change value, a unit of which is nT;

determining an overall axial strain value of a section of the monitored pipeline based on the local longitudinal strain values of the plurality of magnetic test detectors, wherein the overall axial strain value is determined based on:

$$\varepsilon_a = \frac{1}{4n}\sum_{i=1}^{4n}\varepsilon_{Li} - \gamma * \varepsilon_{hp}, \text{ and}$$

$$\varepsilon_{hp} = \frac{PD}{2\delta E},$$

wherein $\varepsilon_a$ is the overall axial strain value, a unit of which is µε; a count of the plurality of magnetic test detectors in the safety pipe loop is 4n; $\varepsilon_{Li}$ is the local longitudinal strain value of the ith magnetic test detector of the plurality of magnetic test detectors, a unit of which is µε; y is a Poisson coefficient of the monitored pipeline, which is dimensionless; $\varepsilon_{hp}$ is a hoop strain of the monitored pipeline, a unit of which is µε; P is an operating pressure of the monitored pipeline, a unit of which is MPa; D is a diameter of the monitored pipeline, a unit of which is mm; and δ is a wall thickness of the monitored pipeline, a unit of which is mm;

determining an axial strain warning threshold of the monitored pipeline;

comparing the axial strain warning threshold with the overall axial strain value; and determining a monitoring strategy based on a signal characteristic of the plurality of magnetic test detectors and the comparison result.

2. The method of claim 1, wherein the axial strain warning threshold is determined based on:

$$\varepsilon_T = \frac{\sigma_s}{2.2E\eta},$$

wherein $\varepsilon_T$ is the axial strain warning threshold, a unit of which is µε; $\sigma_s$ is a yield strength of a material of the monitored pipeline, a unit of which is MPa; and η is a safety factor, which is dimensionless.

3. The method of claim 1, wherein the monitoring strategy includes at least one of:

a strategy that in response to determining that the overall axial strain value is less than the axial strain warning threshold and a signal characteristic of the plurality of magnetic test detectors is a separated state, a circumferential weld of the monitored pipeline is monitored, and a pipeline body of the monitored pipeline is used normally;

a strategy that in response to determining that the overall axial strain value is less than the axial strain warning threshold and the signal characteristic of the plurality of magnetic test detectors is a similar trend state, the circumferential weld of the monitored pipeline and the pipeline body of the monitored pipeline are used normally;

a strategy that in response to determining that the overall axial strain value is greater than or equal to the axial strain warning threshold and the signal characteristic of the plurality of magnetic test detector is a separated state, the circumferential weld of the monitored pipeline is repaired immediately, and the pipeline body is monitored; or a strategy that in response to determining that the overall axial strain value is greater than or equal to the axial strain warning threshold and the signal characteristic of the plurality of magnetic test detector is a similar trend state, the circumferential weld of the monitored pipeline and the pipeline body of the monitored pipeline are monitored.

4. The method of claim 1, wherein the protective shell includes an upper half-ring and a lower half-ring that are operably connected and symmetrical with each other;

a first end of the upper half-ring and a first end of the lower half-ring are hinged; a second end of the upper half-ring and a second end of the lower half-ring are respectively provided with a lug; the lugs of the upper half-ring and the lower half-ring are detachably connected, or the lugs at the first end of the upper half-ring and the first end of the lower half-ring are detachably connected, and the lugs at the second end of the upper half-ring and the second end of the lower half-ring are detachably connected.

5. The method of claim 4, wherein a rubber gasket is provided between the upper half-ring and the lower half-ring.

6. The method of claim 1, wherein one of the plurality of magnetic test detectors includes at least one sensor and a housing for protecting the at least one sensor; a count of the at least one sensor is one or two; the housing includes a non-metallic material; the at least one sensor includes a single-axis fluxgate sensor.

* * * * *